Figure 1:
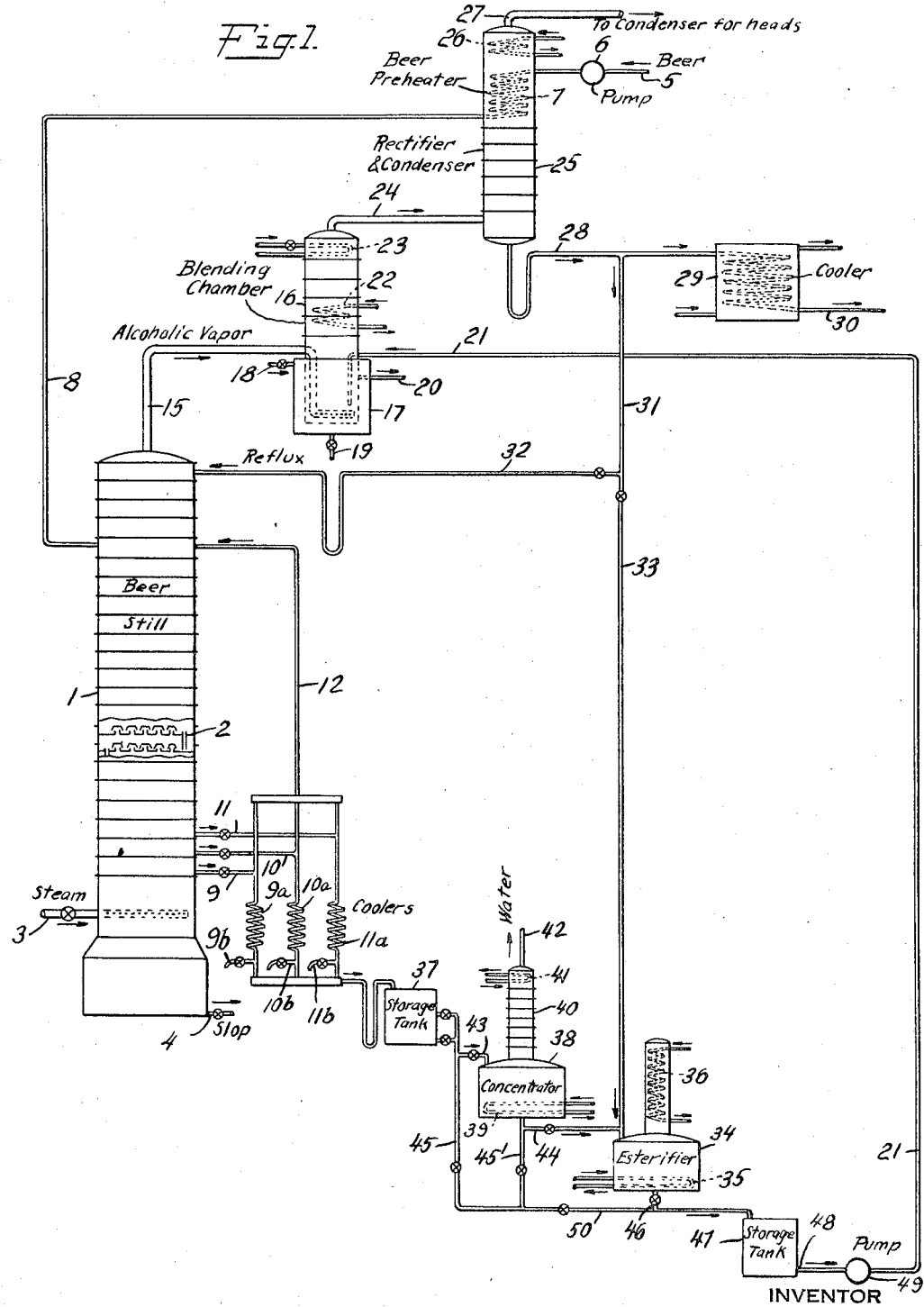

Jan. 4, 1938.     F. G. RING     2,104,244
PROCESS FOR MANUFACTURE OF SPIRITUOUS LIQUORS
Filed Aug. 1, 1935     2 Sheets-Sheet 1

INVENTOR
Frederick Garthwaite Ring
BY Forbes Selahy
ATTORNEY

Jan. 4, 1938. F. G. RING 2,104,244
PROCESS FOR MANUFACTURE OF SPIRITUOUS LIQUORS
Filed Aug. 1, 1935 2 Sheets-Sheet 2
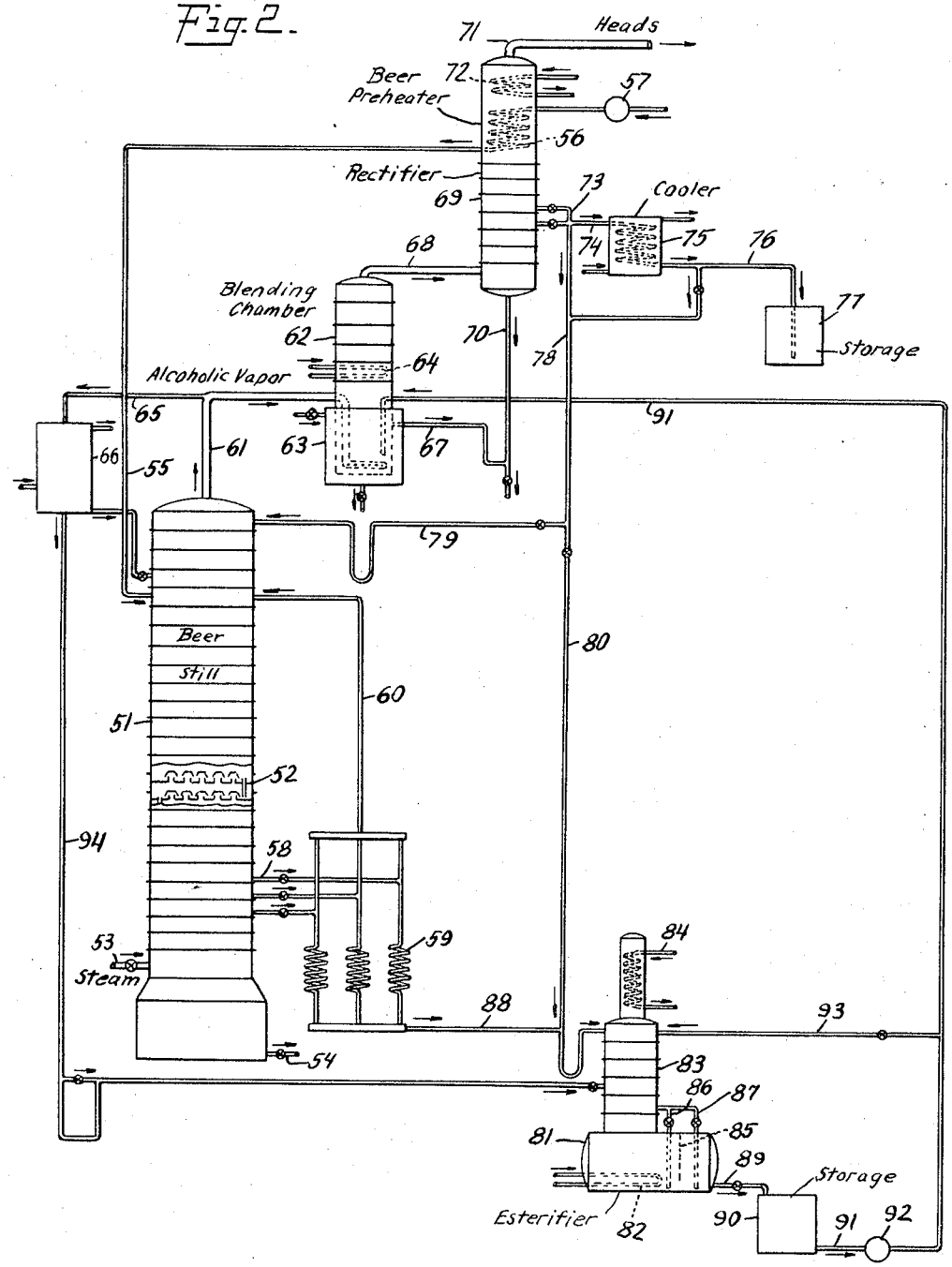

Patented Jan. 4, 1938

2,104,244

UNITED STATES PATENT OFFICE

2,104,244

PROCESS FOR MANUFACTURE OF SPIRITUOUS LIQUORS

Frederick Garthewaite Ring, Newark, N. J., assignor to Semet-Solvay Engineering Corporation, New York, N. Y., a corporation of New York Application August 1, 1935, Serial No. 34,161

7 Claims. (Cl. 99—48)

This invention relates to the production of spirituous liquors of improved flavor, body, and aroma. In the manufacture of alcoholic liquors, such as whiskey, brandy, rum, etc., it was at one time common to effect distillation of the liquors resulting from fermentation of the mash or wort, etc., hereinafter referred to as "beer", in a so-called "pot-still", a simple distillation apparatus wherein the beer was heated by the direct action of the fire or by steam. Distilled liquors obtained by this method, after aging, were highly flavored and possessed an agreeable taste and aroma.

In more recent years the old type of distillation apparatus has been replaced to a large extent by continuous column stills or similar apparatus in order to obtain improved heat economies and more complete recovery of alcoholic distillate from the beer. The substitution of these new types of apparatus for the old has been found, however, to yield products possessing low body and having a poorer flavor and aroma than products formerly produced.

In U. S. application Serial No. 727,616 of May 26, 1934 of Frederick Garthewaite Ring it has been shown that by suitable regulation or alteration of the continuous distillation procedure not only may spirituous liquors of improved flavor, body, and aroma be produced but products may be produced possessing these qualities even to a greater extent than those resulting from the operation of the less used pot stills. The improved products require a substantially shorter period of time for aging than former products since upon their recovery from the distillation they possess to a very materially increased degree the qualities desired in the final product.

The improved process therein described involves a withdrawal of vapors from the distillation system at a point where the vapors contain relatively large proportions of aliphatic acids; particularly acids containing more than two and less than 11 carbon atoms in the acid molecule. This portion of vapors is concentrated by fractional distillation or condensation to give a product in which the desired aliphatic acids are present in very materally increased concentration. The concentrate is then introduced into the distillation system at a point where it comes into contact with relatively concentrated alcoholic distillate at an elevated temperature whereby reaction between the alcohol and acids takes place, yielding esters which in the final product greatly improve its body, aroma, and flavor.

The present invention is directed to improvements in the above process.

In bringing fatty acid concentrate into contact with the alcoholic distillate of a column still, for example by passing the vapors from the still through a body of liquid containing the concentrated aliphatic acids, it is desirable to regulate the contact and temperature of treatment so that substantial esterification of the fatty acids is effected. It is further necessary, however, to regulate the contact so that a substantial quantity of the resultant esters is carried along with the alcoholic vapors leaving the reaction chamber. In order to produce a product of maximum quality and uniformity, it is essential that both of these conditions be carefully maintained. The conditions of reaction most effective for esterification are not always the most effective for conveying the maximum quantity of esters into the distillate.

It has now been found that the reaction may be more accurately controlled and beverages having a high ester number may be prepared with increased facility by withdrawing a minor portion, say 15% to 35% of the alcoholic distillate from the system at a point where it has a high alcohol concentration, bringing this portion into intimate contact with the fatty acids or fatty acid concentrate at an elevated temperature to cause esterification of the alcohol and acid, and subsequently introducing the resultant esters into the alcoholic distillate.

Preferably the liquid resulting from the esterification is brought into contact with the alcoholic distillate vapors under such conditions that the esters are carried off with the alcohol vapors and are thus separated from unesterified acids and other less volatile constituents which are not desired in the final product.

In the accompanying drawings, Fig. 1 illustrates diagrammatically one embodiment of the present invention of general application but more especially adapted for a batch esterification; and Fig. 2 illustrates a second embodiment particularly adapted for continuous esterification of the fatty acids.

With particular reference to Fig. 1 of the drawings, numeral 1 designates a continuous column still divided into a series of sections 2 which may be superimposed bubble trays of any of the well-known types. A perforated steam pipe 3 is provided for supplying steam to the column still and a draw-off 4 is provided for removing distillation residue (slops) therefrom. The column still 1 is arranged to receive beer through a supply pipe 5, pump 6, preheater 7, and connecting pipe line 8. The column 1 also has valved vapor outlets 9, 10, 11 adapted for the regulated withdrawal of vapors from the column still and provided with coolers 9a, 10a, and 11a, and taps 9b, 10b, and 11b. A vapor return line 12 connects these outlets with the upper section of the column still. At the top of still 1 is a vapor outlet 15 leading to a blending chamber 16.

The blending chamber 16 is essentially a device for effecting distillation of esters from solution and mixing them with the alcoholic vapors from the still. The pipe 15 extends nearly to the bottom of the blending chamber and has perforations for distribution of vapors in the liquid contained in the chamber. As illustrated the chamber has a lower heated section and an upper short bubble tray column. It is provided with a steam jacket 17 having a steam inlet 18 and water outlet 19. An overflow pipe 20 is arranged for removal of liquid from the lower section of the blending chamber. A supply pipe 21 is arranged for introduction of fatty acids into the bottom of the chamber 16. Below the bubble tray section of the chamber a cooling coil 22 is provided for prolonging contact of vapors and liquid when desired. The bubble tray section may be provided with a cooling coil 23 at the top thereof for supplying reflux liquid. From the top of the blending chamber 16 a vapor conduit 24 leads to a rectifier and condenser 25 for separating highly volatile constituents normally termed "heads" from the distillates.

The rectifier and condenser 25 may comprise a plurality of bubble trays or other means for bringing ascending vapors into intimate contact with a descending stream of liquid. The beer preheater 7 is positioned near the top of the rectifier and cools the vapors to cause condensation of the alcoholic distillate. An auxiliary cooler 26 may also be provided for securing accurate regulation of the temperature at the top of the column. A vapor outlet 27 at the top of the column may lead to any suitable recovery apparatus for heads, such as for example a water-cooled condenser.

A liquid outlet 28 leads from the bottom of the condenser tower to a cooler 29 for reducing temperature of the condensed distillate to around normal temperature so as to prevent subsequent evaporation of alcohol therefrom. From this cooler a pipe 30 leads to suitable collection and storage means (not shown) for the final product. A pipe 31 connects liquid withdrawal pipe 28 with a valved reflux line 32 arranged to supply reflux liquid to beer still 1 and with another valved line 33 for conveying liquid distillate to an esterifier 34.

The esterifier 34 may be a simple refluxing vessel having heating means, such as a steam coil 35 at the bottom thereof and cooling means, such as a water cooled coil 36 at the top for condensing vapors and returning them to the heated section. The esterifier is provided for esterification of fatty acid condensate collecting in coolers 9a, 10a, and 11a.

A storage tank 37 for these acids, a concentrator 38, and suitable pipe lines for conveying the acid concentrate to the esterifier 34 are provided.

Concentrator 38 may be a simple still provided with steam heating coil 39 at the bottom thereof and a reflux column 40 at the top thereof. A cooling coil 41 is provided at the top of the reflux column for condensing liquid and supplying reflux to the column 40. A vapor outlet 42 is provided for taking off vapors from the column and may lead to any suitable recovery or exhaust means. The vapors may, for example, be returned to beer still 1. A valved outlet line 44 leads from the bottom of concentrator 38 to the esterifier 34. Valved pipe line 43 connects storage tank 37 and concentrator 38. Valved by-pass lines 45 and 45' are arranged so that liquid may be conveyed from storage tank 37 directly to esterifier 34 without passage through the concentrator 38, when this is desired. From the esterifier an outlet 46 leads to storage tank 47 from which liquid may be withdrawn through a line 48 and pump 49 for conveyance through line 21 to the blending chamber 16. A drain line 50 may be provided for removing liquid from the storage tank and concentrator 38, directly to storage tank 47.

It will be understood that the apparatus above described will be constructed of suitable materials capable of withstanding the action of the liquids during treatment as is well known in the art. Normally, the units of the system, particularly the bubble tray columns, and the several vapor lines should be well insulated to improve refluxing conditions and conserve the heat of the system although for simplicity of illustration this has not been shown in the drawings.

The apparatus above described may be operated as follows to secure the benefits of the present invention in preparing a rye whiskey distillate of 125 proof, for example:

The beer (a rye mash fermented for 2 to 3 days in customary manner) is supplied through inlet pipe 5 to pump 6. It passes through preheater 7 to beer still 1, flowing down therethrough from tray to tray. Steam is introduced through pipe 3 at the bottom of the column to supply heat to the beer passing down therethrough. The more volatile portions of the beer are thus vaporized and pass upwardly countercurrent to the flow of liquid in the column. This countercurrent flow, as is well known, assists in effecting separation of the individual constituents of the beer. Distillation residue is withdrawn through outlet 4 at the bottom of the still. The vapors passing upwardly through the column above the inlet pipe 8 meet a descending stream of reflux condensate, which is introduced through pipe 32, and are thus further rectified to an alcohol content of about 65 (liquid volume) percent. The rectified vapors leave the column at a temperature of about 88° or 90° C. They contain impurities, such as aldehydes or "heads", a portion of the tails, and may also contain some of the lower fatty acids.

The alcoholic vapors pass through pipe 15 into blending chamber 16 and bubble up through the body of liquid maintained therein. The body of liquid comprises, in addition to condensate formed by cooler 22, a fatty acid ester solution supplied through pipe 21. This ester solution normally contains free fatty acids and hence some further esterification may be desirable in the blending chamber. Accordingly, the alcoholic vapor and the ester solution are both introduced near the bottom of the blending chamber where they are brought into intimate contact. Heat is supplied by means of steam jacket 17 so as to assist in esterifying the fatty acids and prevent undue cooling and condensation of the alcoholic vapor. The vapor carrying ester vapors and entrained acids bubbles up through the body of liquid and then comes into contact with cooling coil or condenser 22. This coil is so arranged that it effects a partial condensation of the vapors without substantial fractionation. Condensate flows back to the body of liquid in the reaction chamber. The steam jacket 17 and condenser 22 cooperate to provide a high temperature and an extended period of contact between alcohol and acids, thus effecting esterification of the fatty acids present in the chamber 16. The steam jacket also supplies heat for assisting the vaporization of fatty acid esters, both the acid esters in the solution introduced into the chamber and those formed in the chamber. Condenser 22 effects only a partial condensation of vapors so that alcoholic vapors and fatty acids pass up through the reflux section of column 16 and out through vapor outlet 24. In the short reflux section of chamber 16 any entrained acids are eliminated and any vapors of acids and other undesirable impurities of lower volatility than the desired product are condensed. These materials in liquid phase pass back into the heated part of the chamber and are withdrawn from time to time through outlet 20. They may then be processed for separation of desired fatty acids and esters from other constituents such as fusel oil.

The vapors passing through pipe 24 contain alcohol in the proportion desired in the final product, say 65%, and fatty acid esters introduced thereinto in the chamber 16. They also contain impurities more volatile than the distillate. In order to remove these highly volatile impurities, the vapors are conducted to the rectifier 25 where they pass upwardly countercurrent to a stream of condensate resulting from the cooling of the vapors by beer preheater 7, and possibly by the cooler 26. The temperature of the vapors leaving the top of the column 25 is advantageously maintained at around 35–45° C. so that no substantial amount of alcohol will pass off in vapor form, whereas the more volatile constituents (heads) pass out through the vapor conduit 27. The alcohol and water, together with the other constituents making up the final product, are condensed and are removed from the rectifying column 25 through outlet 28. The major portion of this product, say around 50 to 75% thereof, may be passed through cooler 29 and pipe 30 to suitable storage means. This constitutes the final distillate product. A portion, say 5 to 30% is passed through pipe 31 and reflux line 32 to the top of beer still 1 where it serves as reflux liquid in this column. Less than half, more particularly around 15% to 35% of the condensate passing through outlet 28 is drawn off through line 33 to esterifier 34.

The aliphatic acids, whose esters are desired in the final product, are obtained during the distillation process as follows:

A portion of the vapors in the lower section of column 1 is gradually removed through one or more of the outlets 9, 10 and 11 at the point or points where the desired acids are at their maximum concentrations. This may be determined by sampling through taps 9b, 10b, and 11b on the several lines. The point of removal normally will be low down in the column. The acids desired for the esterification are those containing between 4 and 11 carbon atoms. The particular location at which acids should be withdrawn may vary depending upon the temperature and volume of steam employed. The vapors thus withdrawn are condensed in coolers 9a, 10a, or 11a. The resultant liquid may be concentrated or passed directly to esterifier 34. In making distillates of 125 proof or higher, it is unnecessary to concentrate the acids before passing them to the esterifier. Otherwise concentration is advisable.

When the acids are to be concentrated, acid vapors may be treated without first condensing them, but it is preferred for the sake of ease of manipulation to convey them as liquid to the concentrator 38. In this manner the concentrator may be operated intermittently and the acids may be withdrawn from the still continuously and stored in the storage tank 37. Around 60% to 70% by volume of the liquid introduced into concentrator 38 is permitted to pass off in vapor form through outlet 42. By means of cooler 41 a portion of the vapors is condensed and collected on trays of the rectifying column to serve as reflux liquid for the vapors evolved. If desired, provision may be made for separation and withdrawal of "tails", the undesirable distillate containing the poisonous fusel oil. The residue from the distillation in concentrator 38 is withdrawn through outlet 44 to esterifier 34.

The ratio of the fatty acid solution to alcoholic distillate introduced into the esterifier is regulated so that the resultant mixture in the esterifier has a concentration of alcohol of at least 48% by volume, preferably around 50%. For example, the liquid in the esterifier may contain, per liter, 5 grams of fatty acids, 466 grams of ethyl alcohol, and 500 grams of water. The alcohol acid mixture is boiled for ½ to 2 hours in the esterifier, the vapors being condensed and returned to the liquid during the boiling operation. At the end of this period the esterified liquid is withdrawn from esterifier 34 through outlet 46 to storage tank 47 from which it is pumped by means of pump 49 and pipes 48 and 21 to the blending tank 16 from time to time as required to maintain a suitable quantity of the liquid in this chamber.

While the above apparatus is especially designed for batch operation of the esterifier, it may be operated continuously, in which case fatty acids may be continuously introduced into the concentrator and fatty acid concentrate may be continuously withdrawn to the esterifier. Ester liquor in the esterifier will then be continuously removed at such a rate that the contents are subjected to an average period of heating around ½ to 2 hours in passage through the esterifier.

In Fig. 2 of the drawings an alternative apparatus for carrying out the process of the present invention is illustrated which is especially arranged for continuous operation of the esterifier. Numeral 51 designates a beer still of the column type having bubble trays 52, a steam inlet 53, and slop outlet 54 as in Fig. 1. An inlet 55 for introduction of beer from a preheater 56 by means of a pump 57 is provided at the upper section of the column. In the bottom of the column 51 vapor drawoffs 58 are provided for withdrawal of fatty acid vapor from the column. Coolers 59 are provided for condensation of these vapors. Return vapor line 60 is arranged for passage of uncondensed vapors back to the column. Vapor conduit 61 leads from the top of the column to blending chamber 62 provided with a steam jacket 63 and cooler 64. An additional vapor withdrawal line 65 leading to a condenser 66 is also shown. Liquid outlet 67 from the lower part of blending chamber 62 is provided for withdrawal of liquid therefrom. A vapor conduit 68 leads from the top of the chamber to the bottom of a rectifying column 69.

Rectifying column 69 is arranged for the withdrawal of "tails" in liquid form at the bottom thereof and accordingly has a liquid outlet 70 for this purpose. A vapor outlet 71 for withdrawal of "heads" is provided at the top of the column and cooler 72 is arranged for accurate temperature control. The midsection of the column is provided with liquid outlets 73 for withdrawal of alcoholic distillate. A line 74 leads to a cooler 75 for cooling this distillate and a line 76 and storage tank 77 are shown for its collection. A pipe 78 for withdrawing liquid from either line 74 or 76 leads to valved reflux line 79 for returning reflux liquid to the top of the still 51 and valved withdrawal line 80 for conveying distillate to an esterifier 81.

Esterifier 81 comprises a lower heated section which may be provided with heating means, such as steam coil 82, and a reflux section 83 having a cooler 84 at the top thereof. Within the heated section is a baffle 85, arranged so that liquid on only one side thereof is subjected to the heating action of coil 82. Liquid lines 86 and 87 are arranged for withdrawing liquid from a tray at the bottom of the rectifying column and introducing it at will into the heated section of the esterifier on either side of the baffle. Pipe line 88 is arranged for conducting fatty acid condensate collected from coolers 59 to the top of the column 83. A liquid draw-off 89 leads from the lower section of the esterifier to a storage tank 90.

From storage tank 90 a liquid outlet pipe 91 provided with a pump 92 permits the withdrawal of solution from this tank and conveyance thereof either into blending chamber 62 or through a recirculation line 93 into the top of the column 83. From condenser 66 a pipe line 94 is shown leading to the midsection of column 83, thus a portion of the vapors may be withdrawn from the beer still and introduced into this column prior to condensation or they may be condensed in condenser 66 and then introduced into the column. This permits operation of the system alternatively either by using condensate from the final product for the rectification or by using liquid or vapor from the beer still. If desired the condenser 66 may be a small rectifier for concentrating the alcoholic distillate before introducing it into the esterifier. Operation of the above system may be varied as with the system illustrated in Fig. 1 and the following example is therefore merely illustrative.

A beer (a rye mash fermented for from 2 to 3 days in the customary manner) is supplied by pump 57 through preheater 56 and inlet 55 to column 51 and flows down therethrough from tray to tray. Steam is introduced by means of pipe 53 at the bottom of fractionating column 51 to supply heat to the beer passing down therethrough. The more volatile portions of the beer vaporize and pass upwardly countercurrent to the flow of liquid. Distillation residue is withdrawn through outlet 54 at the bottom of the still. Reflux liquid is introduced through line 79 so as to maintain at the top of the column the temperature required to yield a distillate of the desired alcohol content, say 88° to 92° or 93° C. to yield an alcoholic content of around 60% to 70% (liquid volume). The vapors passing off through outlet 61 contain impurities such as aldehydes or "heads" and may also contain some of the lower fatty acids. These vapors pass into reaction chamber 62 at the bottom thereof and bubble up through the body of liquid therein. Heat is supplied by means of steam jacket 63. This body of liquid comprises solution supplied by pipe line 91 from the esterifier 81 and the products of condensation of the alcoholic vapors. Cooling liquid may be passed through coil 64. Vapors pass up through a series of baffles or bubble trays through the column so that entrained matter is separated. They then pass to rectifier 69.

In rectifier 69 the vapors are cooled by countercurrent contact with condensate resulting from the cooling effect of coil 56 and possibly cooler 72 so that alcoholic portions are condensed in the upper part of the column. In the lower portion of the column "tails" are condensed and are withdrawn through outlet 70. The alcoholic condensate is withdrawn through pipe 73 or 74 to cooler 75 and then to storage tank 77. A portion of the liquid is returned via pipe 78 and 79 to the top of beer still 51.

A small portion, say around 15% to 35% of the liquid withdrawn at 73 or 74 is passed while yet hot through pipe 80 to the esterifier 81. At the same time aliphatic acid condensate is introduced into the esterifier through pipe 88 preferably while it is still at a high temperature after its condensation. The fatty acids and alcohols intermingle and pass down through the tower 83 countercurrent to hot vapors rising in the column. At the top of the column cooler 84 condenses vapors and returns condensate to the column. Liquid is continuously withdrawn through pipe 89 to tank 90 and thence is pumped by means of pump 92 up to blending chamber 62. A portion amounting to around 15% of the total liquid passing from the tank 90 is returned to the top of tower 83 for further action by the hot vapors therein. By thus recirculating a portion of the liquid, the degree of esterification may be increased to that desired in the outlet pipe 91. The liquid descending from tray to tray in the column 83 becomes more highly esterified in its descent. A portion of this liquid may be withdrawn from the bottom plate and returned through line 86 to the heated section of the esterifier. The remainder is withdrawn through outlets 87 and 89 for removal to storage tank 90.

Instead of introducing alcohol at the top of the tower by means of pipe 80, a small portion of the vapors leaving the beer still may be withdrawn through vapor outlet 65 and conducted by means of pipe 94 to the column 83 and introduced therein so as to be condensed by the colder liquid in the column, or cooling fluid may be passed through condenser 66 so as to condense the vapors before passage into the column, in which case they may be mixed with the fatty acids prior to introduction into the column or may be introduced separately. Where condenser 66 effects a rectification and concentration of vapors, a much higher alcohol concentration may be obtained than that desired in the final product. This higher alcohol concentration serves to assist the esterification.

By the process above described a clean beverage free from mashy odor and having an ester count of from 30 to 100 grams per 100 litres, which is well above that obtained by formerly known processes, is produced. The product, in addition to being superior to the usual distillates in regard to its ester count, its flavor, and its aroma, is very responsive to aging with the result that less time is consumed in this step, less storage facilities are required, and substantial savings are effected.

It will be understood from the above description that the object of the process is to introduce into the alcoholic distillate the ethyl esters of those acids which normally are expelled with the distillation residue, thus raising the ester count to around 30 to 100. Obviously these acids may be obtained from the same mash as the distillate or from a different mash. Hence where in the claims reference is made to separation of acids from the mash, it will be understood that a mash is contemplated which is of the same general character as that from which the alcohol distillate is obtained.

I claim:

1. In the production of a spirituous liquor in a distillation system wherein a stream of alcoholic vapor is distilled from a fermentation product, the improvement which comprises separately distilling off aliphatic acids containing between 2 and 11 carbon atoms from said fermentation product, subjecting the acid distillate while out of the distillation system to esterification to produce the ethyl esters of the acids, heating the resultant esterified solution in intimate contact with the stream of alcoholic vapor at a temperature sufficient to vaporize esters and leave unesterified acids in liquid phase, separating the resultant mixture of alcoholic and ester vapors from the liquid solution, and cooling the vapor mixture to condense the alcoholic distillate containing the esters blended therewith.

2. The method of improving the quality of a spirituous liquor resulting from the distillation of a fermentation product, which comprises withdrawing aliphatic acid distillate from the distillation system at a point of relatively high acid concentration, heating the acids in an alcohol solution containing at least 48% by volume of alcohol to esterify a portion of the acids, heating the resultant partially esterified acid solution in contact with a main portion of the alcoholic distillate vapor from the system so as to effect further esterification thereof and so as to blend the esters with the alcoholic vapor while retaining unesterified acids in liquid phase, separating the liquid and the vapor, and cooling the vapor to condense the alcoholic distillate containing esters blended therewith.

3. The method of improving the quality of a spirituous liquor resulting from the distillation of a fermentation product, which comprises withdrawing aliphatic acid distillate from the distillation system at a point of relatively high acid concentration, withdrawing between 15% and 35% of the alcoholic distillate from the system at a point where it contains a high concentration of alcohol, refluxing the aliphatic acid distillate in intimate contact with the alcoholic distillate fraction at an elevated temperature to esterify a portion of the acids, heating the resultant partially esterified acid solution in contact with a main portion of the alcoholic distillate vapor from the system so as to effect further esterification thereof and so as to blend the esters with the alcoholic vapor while retaining unesterified acids in liquid phase, separating the liquid and the vapor, and cooling the vapor to condense the alcoholic distillate containing esters blended therewith.

4. The method of improving the quality of a spirituous liquor resulting from the distillation of a fermentation product in a continuous distillation system involving a column still, which comprises withdrawing a small part of the distillate from the distillation system at a point near the bottom of the column where the concentrations of aliphatic acids containing between 2 and 11 carbon atoms are relatively high, withdrawing around 15% to 35% of the alcoholic distillate from the system at a point where it contains above about 50% alcohol by volume, mixing the alcoholic distillate with a quantity of the acid distillate such that the alcohol content of the mixture is at least 48%, heating the mixture at a temperature around the boiling point thereof to esterify acids therein, bringing the resultant esterified product into intimate contact with the main stream of alcoholic distillate vapors from the column still at a temperature sufficient to vaporize esters and leave unesterified acids in liquid phase, separating therefrom the alcoholic distillate in vapor phase containing ester vapors, and cooling the vapor mixture to condense a blended alcoholic product.

5. The method of improving the quality of a spirituous liquor resulting from the distillation of a fermentation product in a continuous distillation system involving a column still, which comprises withdrawing a small part of the distillate from the distillation system at a point near the bottom of the column where the concentrations of aliphatic acids containing between 2 and 11 carbon atoms are relatively high, withdrawing around 15% to 35% of the alcoholic distillate from the system at a point where it contains between about 50% and 70% alcohol, evaporating from the aliphatic acid distillate a major part of the water, mixing the residual concentrated acid with the alcoholic distillate in such a ratio that the alcohol content of the mixture is at least 48%, heating the mixture at a temperature around the boiling point thereof to esterify acids therein, bringing the resultant esterified product into intimate contact with the main stream of alcoholic distillate vapors from the column still at a temperature sufficient to vaporize esters and leave unesterified acids in liquid phase, separating from the liquid the alcoholic distillate in vapor phase containing ester vapors, and cooling the vapor mixture to condense a blended alcoholic product.

6. In the production of a potable spirit in a distillation system wherein an alcoholic distillate is obtained by distillation of a fermentation product containing aliphatic acids having between 2 and 11 carbon atoms, the improvement which comprises separately recovering aliphatic acids from the fermentation product, subjecting the acids while out of the distillation system to esterification to esterify a portion of the acids present, heating the resultant partially esterified acid solution in contact with a main portion of the alcoholic distillate vapors from the system so as to effect further esterification thereof and so as to blend the esters with the alcoholic vapor while retaining unesterified acids in liquid phase, separating the liquid and the vapor, and cooling the vapor to condense the alcoholic distillate containing esters blended therewith.

7. The method of improving the quality of a spirituous liquor resulting from the distillation of a fermentation product in a continuous distillation system involving a column still, which comprises withdrawing a small part of the distillate from the distillation system at a point near the bottom of the column where the concentrations of aliphatic acids containing between 2 and 11 carbon atoms are relatively high, withdrawing a minor portion of the alcoholic distillate from the system at a point where it contains above about 50% alcohol by volume, mixing the alcoholic distillate with a quantity of the acid distillate such that the alcohol content of the mixture is at least 48%, heating the mixture to esterify acids therein, bringing the resulting esterified product into intimate contact with the main stream of alcoholic distillate vapors from the column still at a temperature sufficent to vaporize esters and leave unesterified acids in liquid phase, separating therefrom the alcoholic distillate in vapor phase containing ester vapors, and cooling the vapor mixture to condense a blended alcoholic product.

FREDERICK GARTHEWAITE RING.